(12) United States Patent
Nguyen et al.

(10) Patent No.: US 10,595,029 B2
(45) Date of Patent: Mar. 17, 2020

(54) METHODS AND DEVICES FOR CODING BINARY SYMBOLS AS N-TUPLES

(71) Applicant: BlackBerry Limited, Waterloo (CA)

(72) Inventors: Nguyen Nguyen, Seattle, WA (US); Dake He, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 417 days.

(21) Appl. No.: 15/250,048

(22) Filed: Aug. 29, 2016

(65) Prior Publication Data

US 2016/0366432 A1 Dec. 15, 2016

Related U.S. Application Data

(63) Continuation of application No. 13/524,583, filed on Jun. 15, 2012, now Pat. No. 9,462,286.

(51) Int. Cl.
*H04N 19/44* (2014.01)
*H04N 19/46* (2014.01)
*H04N 19/124* (2014.01)
*H04N 19/18* (2014.01)

(52) U.S. Cl.
CPC .......... *H04N 19/44* (2014.11); *H04N 19/124* (2014.11); *H04N 19/18* (2014.11); *H04N 19/46* (2014.11)

(58) Field of Classification Search
CPC ...... H04N 19/44; H04N 19/124; H04N 19/18; H04N 19/46
USPC .................................................. 375/240.25
See application file for complete search history.

(56) References Cited

U.S. PATENT DOCUMENTS

2007/0211950 A1 9/2007 Shima
2013/0094585 A1 4/2013 Misra

OTHER PUBLICATIONS

EPO, Extended European Search Report relating to EP application No. 12172474.4 dated Sep. 30, 2015.
Nguyen, N. et al.: "Adaptive Thresholds for Greater-than-1 and Greater-than-2 Flags", 9. JCT-VC Meeting; 100. MPEG Meeting; Apr. 27, 2014-May 7, 2012; Geneva; (Joint Collaborative Team on Video Coding of ISO/IEC JTC1/SC29/WG11 and ITU-T SG. 16); URL:http://wftp3.itu.int/av-arch/jctvc-site/,, No. JCTVC-I0281, Apr. 17, 2012, XP030112044, *Section "2 Proposal"*.
Chen J. et al.: "Non-CE1: throughput improvement on CABAC coefficients level coding", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-H0554, Jan. 24, 2012, XP030111581, *Section "2 Proposed Method"*.
CIPO, CA Office Action relating to Application No. 2,818,023, dated Feb. 18, 2015.
S. H. Kim, and A. Segall, "non-CE3: Improved high throughput coding method based on last position information", JCTVC-I0337, JCT-VC of ITU-T SG16 WP3 and ISO/IEC JTC1/SC29/WG11, 9th Meeting, Geneva, May 2012.

(Continued)

*Primary Examiner* — Sath V Perungavoor
*Assistant Examiner* — Kristin Dobbs
(74) *Attorney, Agent, or Firm* — Rowand LLP

(57) ABSTRACT

Methods and devices for reconstructing coefficient levels from a bitstream of encoded video data for a coefficient group in a transform unit. Greater-than-one flags are encoded by grouping them into tuples and by encoding a tuple-based value that is a function of the greater-than-one flags within that tuple. The tuple-based value may permit the decoder to infer the greater-than-one flags in some cases, in which case they are not encoded in the bitstream.

23 Claims, 11 Drawing Sheets

(56) References Cited

OTHER PUBLICATIONS

W.-J. Chien, J. Chen, J. Sole, and M. Karczewicz, "TU level threshold for Greater-than-1 Flags", JCTVC-I0359, JCT-VC of ITU-T SG16 WP3 and ISO/IEC JTC1/SC29/WG11, 9th Meeting, Geneva, May 2012.

W. J. Chien, J. Chen, J. Sole, and M. Karczewicz, "CE3 subtest 2.1: context assignment for parallel coefficient level coding", JCTVC-I0303, JCT-VC of ITU-T SG16 WP3 and ISO/IEC JTC1/SC29/WG11, 9th Meeting, Geneva, May 2012.

S.-T. Hsiang, C.-W. Hsu, and S. Lei, "Non-CE3: Modified method for coding transform coefficient level", JCTVC-I0176, JCT-VC of ITU-T SG16 WP3 and ISO/IEC JTC1/SC29/WG11, 9th Meeting, Geneva, May 2012.

F. Bossen, "Common test conditions", JCTVC-H1100, JCT-VC of ITU-T SG16 WP3 and ISO/IEC JTC1/SC29/WG11, 8th Meeting, San Jose, Feb. 2012.

B. Bross, "Suggested bug-fixes for HEVC text specification draft 6", JCTVC-I0030, JCT-VC of ITU-T SG16 WP3 and ISO/IEC JTC1/SC29/WG11, 9th Meeting, Geneva, May 2012.

Hsiang, et al., "Non-CE3 Modified Method for Coding Transform Coefficient Levels" JCTVC-I0176, Joint Collaboration Team on Video Coding, 9th Meeting: Geneva, CH, Apr. 27-May 7, 2012.

EPO, EP Office Action relating to EP application No. 12172474.4, dated Jan. 9, 2018.

Nguyen et al.: "Adaptive Thresholds for Greater-than-1 and Greater-than-2 Flags", 9. JCT-VC Meeting; 100. MPEG Meeting; Apr. 27, 2012-May 7, 2012; Geneva, URL: http://wftp3.itu.into/av-arch/jctvc-site/,, No. JCTVC-I0281, Apr. 17, 2012, XP030112044.

Chen et al.: "Non-CE1: throughout improvement on CABAC coefficients level coding",8. JCT-VC Meeting; 99 MPEG Meeting; Feb. 1, 2012-Feb. 10, 2012; San Jose; URL: http://wftp3.itu.int/av-arch/jctvc-site/,, No. JCTVC-HO554, Jan. 24, 2012, XP030111581.

Nguyen, N. et al.: "Adaptive Thresholds for Greater-than-1 and Greater-than-2 Flags", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG. 16); URL:http://wftp3.itu.int/av-arch/jctvc-site/,, No. JCTVC-I0281, Apr. 17, 2012, XP030112044, *Section "2 Proposal"*.

METHODS AND DEVICES FOR CODING BINARY SYMBOLS AS N-TUPLES

CROSS-REFERENCE TO RELATED APPLICATIONS

The present application is a continuation of U.S. patent application Ser. No. 13/524,583, filed Jun. 15, 2012, the contents of which are hereby incorporated by reference.

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for coding binary symbols as n-tuples, specifically in the case of video coding.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU termed High Efficiency Video Coding (HEVC). The initiative may eventually result in a video-coding standard that will form part of a suite of standards referred to as MPEG-H.

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

When spectrally transforming residual data, many of these standards prescribe the use of a discrete cosine transform (DCT) or some variant thereon. The resulting DCT coefficients are then quantized using a quantizer to produce quantized transform domain coefficients, or indices.

The block or matrix of quantized transform domain coefficients (sometimes referred to as a "transform unit") is then entropy encoded using a particular context model. In H.264/AVC and in the current development work for HEVC, the quantized transform coefficients are encoded by (a) encoding a last significant coefficient position indicating the location of the last non-zero coefficient in the transform unit, (b) encoding a significance map indicating the positions in the transform unit (other than the last significant coefficient position) that contain non-zero coefficients, (c) encoding the magnitudes of the non-zero coefficients, and (d) encoding the signs of the non-zero coefficients. This encoding of the quantized transform coefficients often occupies 30-80% of the encoded data in the bitstream.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
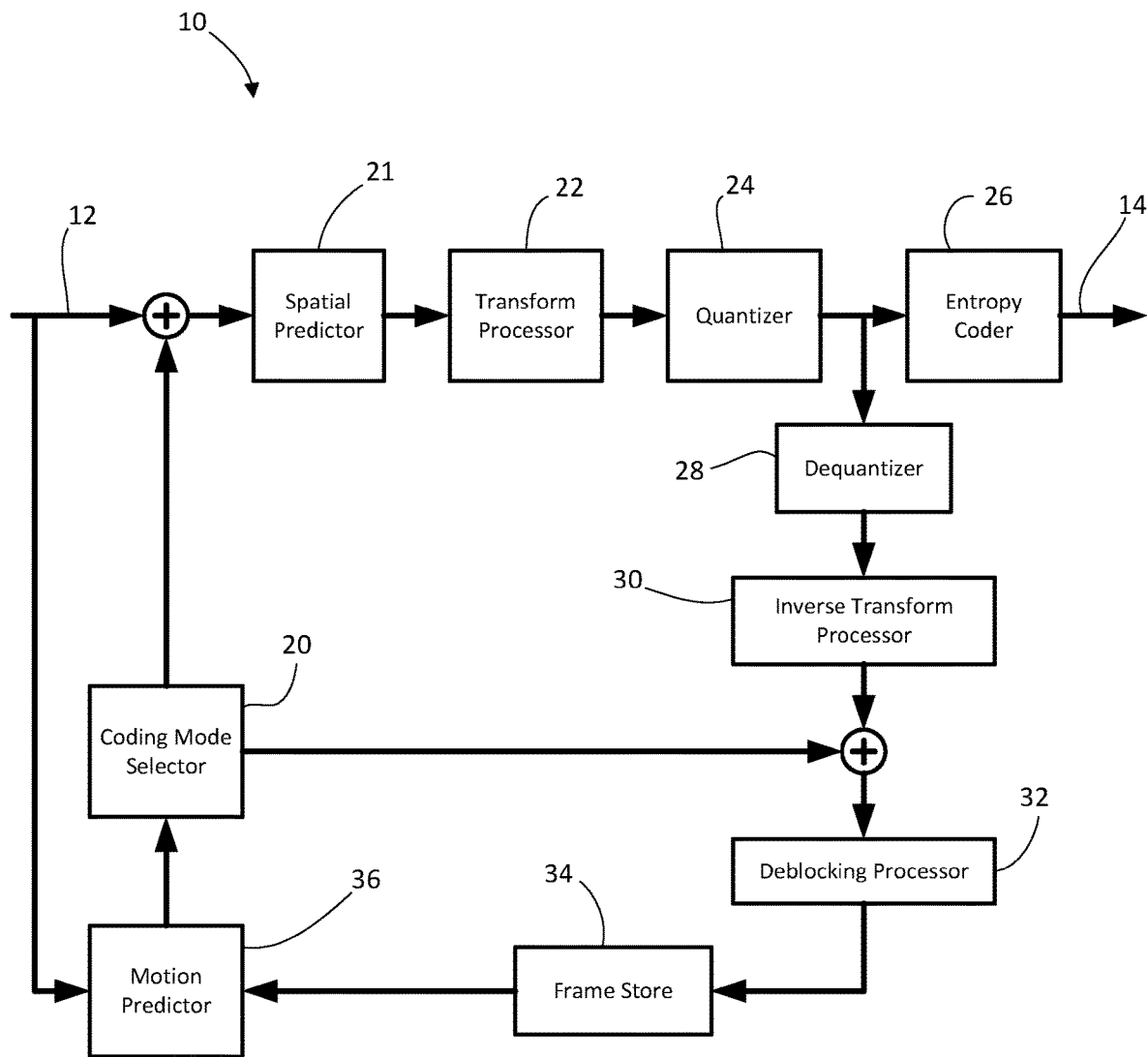
FIG. 1 shows, in block diagram form, an encoder for encoding video.

The present application describes methods and encoders/decoders for encoding and decoding residual video data. In particular, the present application describes methods and devices for reconstructing coefficient levels from a bitstream of encoded video data for a coefficient group in a transform unit. Greater-than-one flags are encoded by grouping them into tuples and by encoding a tuple-based value that is a function of the greater-than-one flags within that tuple. The tuple-based value may permit the decoder to infer the greater-than-one flags in some cases, in which case they are not encoded in the bitstream.

In a first aspect, the present application describes a method of decoding a bitstream of encoded video in a video decoder to reconstruct a plurality of greater-than-one flags for a coefficient group, wherein the plurality of greater-than-one flags are grouped in scan order into tuples of greater-than-one flags. The method includes decoding a tuple-based value from the bitstream for each tuple; and, for each tuple, inferring or decoding the greater-than-one flags for that tuple based on that tuple's decoded tuple-based value, wherein the tuple-based value is a function of the greater-than-one flags in that tuple.

In another aspect, the present application describes a method of encoding video in a video encoder to output a bitstream of encoded data by encoding a plurality of greater-than-one flags for a coefficient group, wherein the plurality of greater-than-one flags are grouped in scan order into tuples of greater-than-one flags. The method includes grouping the greater-than-one flags in scan order into non-overlapping tuples of greater-than-one flags; determining a tuple-based value for each tuple as a function of the greater-than-one flags in that tuple; encoding the tuple-based values in the bitstream; and, for each tuple, for each greater-than-one flag in that tuple, if that greater-than-one flag cannot be inferred then encoding that greater-than-one flag in the bitstream.

In another aspect, the present application describes a method of decoding a bitstream of encoded video to reconstruct a set of coefficients in a video decoder, the set of coefficients including at least two non-zero coefficients each having a magnitude greater than one. The method includes decoding a significant coefficient flag for each coefficient in the set, wherein each significant coefficient flag indicates whether its associated coefficient is non-zero; and for each non-overlapping tuple of non-zero coefficients, wherein each non-overlapping tuple of non-zero coefficients corresponds to a tuple of respective greater-than-one flags, decoding a tuple-based value, wherein the tuple-based value is a function of the greater-than-one flags in that tuple, and based on the decoded tuple-based value, inferring or decoding the greater-than-one flags for that tuple.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing HEVC standard. Those ordinarily skilled in the art will understand that the present application is not limited to H.264/AVC or HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. The term "frame" may be replaced with "picture" in HEVC. Other terms may be used in other video coding standards. It will also be appreciated that certain encoding/decoding operations might be performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

Figure 2:
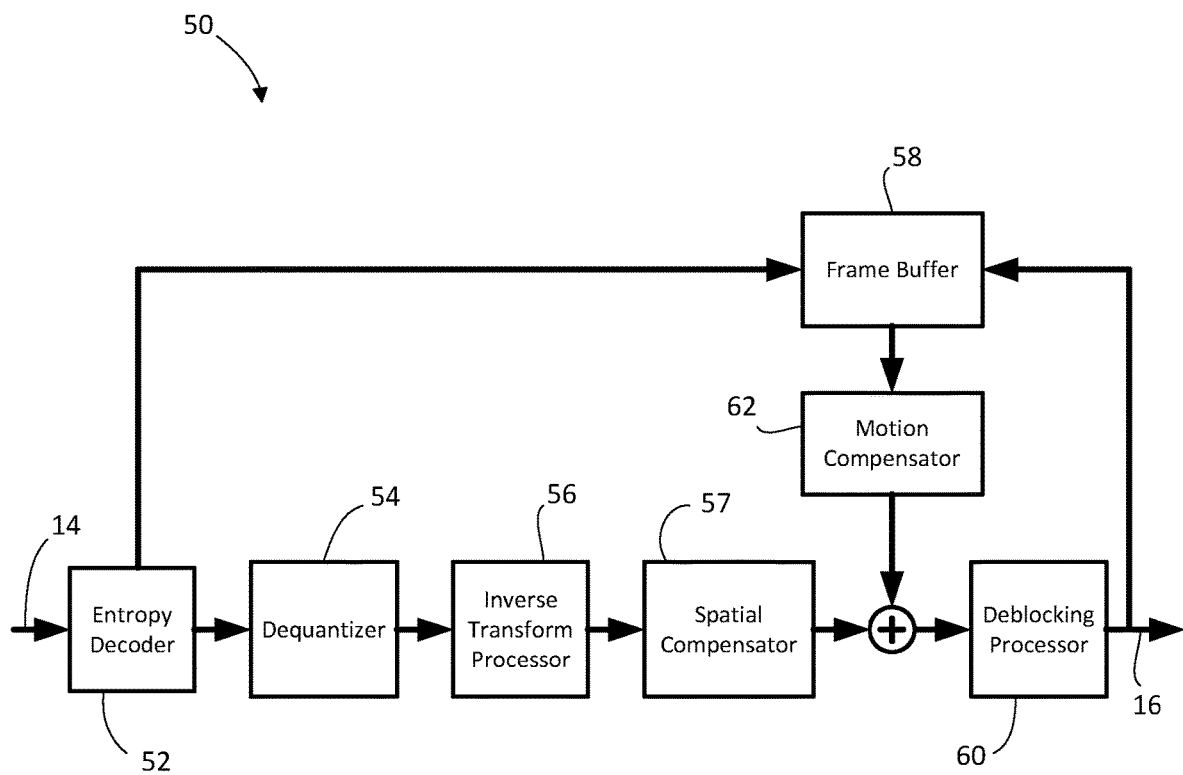
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a coding unit, macroblock or sub-block basis, depending on the size of the macroblocks or coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

The block or matrix of quantized transform domain coefficients may be referred to herein as a "transform unit" (TU). In some cases, the TU may be non-square, e.g. a non-square quadrature transform (NSQT).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks or coding units to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock or coding unit, the recreated "video data" is the residual data for use in spatial compensation relative to a previously decoded block within the frame. The spatial compensator 57 generates the video data from the residual data and pixel data from a previously decoded block. In other cases, such as inter-coded macroblocks or coding units, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock or coding unit. It does so based on the reference frame information and motion vector specified for the inter-coded macroblock or coding unit. It then supplies the reference block pixel data for combination with the residual data to arrive at the reconstructed video data for that coding unit/macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

Quantized Transform Domain Coefficient Encoding and Decoding

The present application describes example processes and devices for encoding and decoding transform coefficients of a transform unit. The non-zero coefficients are identified by a significance map. A significance map is a block, matrix, group, or set of flags that maps to, or corresponds to, a transform unit or a defined unit of coefficients (e.g. several transform units, a portion of a transform unit, or a coding unit). Each flag indicates whether the corresponding position in the transform unit or the specified unit contains a non-zero coefficient or not. In existing standards, these flags may be referred to as significant-coefficient flags. In existing standards, there is one flag per coefficient from the DC coefficient to the last significant coefficient in a scan order, and the flag is a bit that is zero if the corresponding coefficient is zero and is set to one if the corresponding coefficient is non-zero. The term "significance map" as used herein is intended to refer to a matrix or ordered set of significant-coefficient flags for a transform unit, as will be understood from the description below, or a defined unit of coefficients, which will be clear from the context of the applications.

The significance map may be converted to a vector in accordance with the scan order (which may be vertical, horizontal, diagonal, zig-zag, or any other scan order permitted under the applicable standard). The scan is typically done in "reverse" order, i.e. starting with the last significant coefficient and working back through the significant map in reverse direction until the significant-coefficient flag in the upper-left corner at [0,0] is reached. In the present description, the term "scan order" is intended to mean the order in which flags, coefficients, or groups, as the case may be, are processed and may include orders that are referred to colloquially as "reverse scan order". Each significant-coefficient flag is then entropy encoded using the applicable context-adaptive coding scheme.

The levels for those non-zero coefficients may then be encoded. In some standards, levels are encoded by encoding one or more level flags. If additional information is required to signal the magnitude of a quantized transform domain coefficient, then remaining-level data may be encoded. In one example implementation, the levels may be encoded by first encoding a map of those non-zero coefficients having an absolute value level greater than one, i.e. greater-than-one flags. Another map may then be encoded of those non-zero coefficients having a level greater than two, i.e. greater-than-two flags. The value or level of any of the coefficients having an absolute value greater than two is then encoded, i.e. remaining-level data. The value encoded in the remaining-level integer may be the actual value minus three. The sign of each of the non-zero coefficients is also encoded. Each non-zero coefficient has a sign bit indicating whether the level of that non-zero coefficient is negative or positive.

In some implementations, coefficients in a transform unit are partitioned into coefficient groups. For example, a 16×16 TU may be partitioned into sixteen 4×4 coefficient groups. Each coefficient group may have a significant-coefficient-group flag that indicates whether any of the significant-coefficient flags in that group are non-zero, or whether they are all zero (or may be inferred to be all zero). The significant-coefficient-group flag indicates whether the bitstream contains any significant-coefficient flags (and other level related flags) or whether the decoder may infer that the group contains all zero coefficients. The encoder and decoder may process all parameters within a coefficient group in a scan order within the group before moving to the next group. The encoder and decoder may progress from coefficient group to coefficient group in a group scan order (which may or may not be the same as the scan order used within groups). Coefficient groups may be square, e.g. 4×4, or may be non-square, e.g. 2×8 or 8×2, etc.

Significance flags are encoded using context-adaptive encoding. For example, in many applications a context-adaptive binary arithmetic coding (CABAC) scheme may be used. In 4×4 and 8×8 TUs, the context for a significance flag depends upon its position in the TU. In other TUs, the context for a significance flag depends both on its position and on the significant-coefficient-group flag of neighbouring right and lower coefficient groups.

Figure 3:
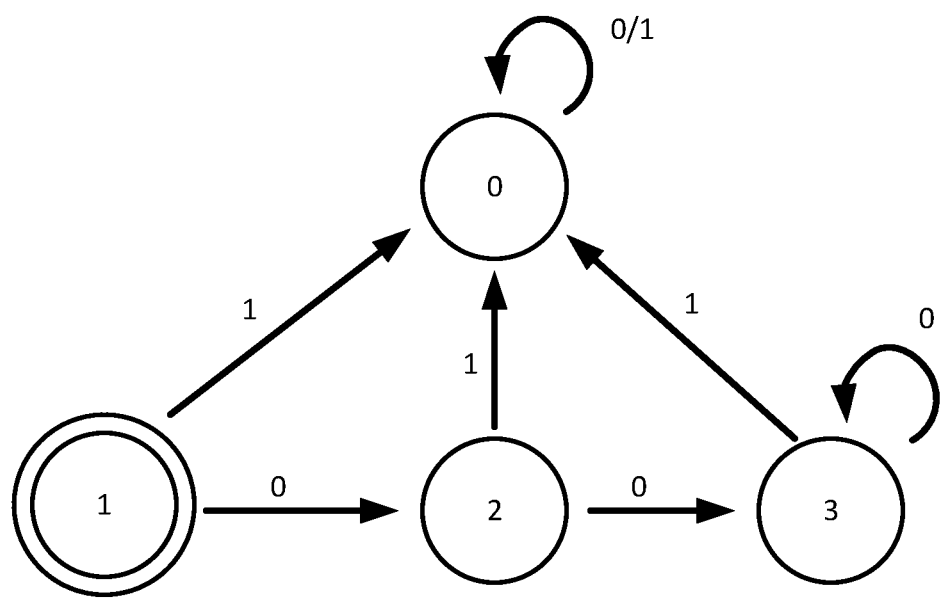
FIG. 3 shows a state machine used to determine context for encoding greater-than-one flags.

HEVC limits the number of context-coded greater-than-one flags to 8 per TU and limits the number of greater-than-two flags to 1 per TU. A context set is selected based upon the frame type and the region in which the coefficient group is located in the TU. The context set for greater-than-one flags includes four contexts. FIG. 3 shows an example state machine used for determining the context used for coding a greater-than-one flags. The machine starts with context 1 and transitions to other states dependent upon the value of the greater-than-one flag. Accordingly, when coding a greater-than-one flag, context is determined by the state machine and is then updated based on the value of the coded greater-than-one flag. It will be appreciated that the need to update and determine context based upon the value of the previous greater-than-one flag when coding the next greater-than-one flag limit data throughput because context cannot be derived in parallel. In some example implementations, there is one context for greater-than-two flags.

Remaining levels are not encoded using context-adaptive coding. In HEVC, remaining levels are coded using Rice codes and a $0^{th}$-order exponential Golumb code. Sign bits are coded using EP (equiprobable) coding. Coding of remaining levels and signs are referred to as "bypass coding" since they do not involve context derivation and updates. Context-based coding generally provides better compression, but is more complex than bypass coding.

Worst-Case Throughput

In hardware design, the worst-case must be accommodated. Even if the average throughput is improved, if a design causes the worst-case scenario to require additional memory and/or processor resources, then it is more costly from a hardware point of view. In the case of video encoders and decoders, worst case throughput (insofar as transform domain coefficient coding/decoding is concerned) is measured as the number of context-coded bins per transform coefficient. Ideally, this number is as small as possible. The assessment focuses on context-coded bins because they are significantly more complex than encoding/decoding bypass bins (which can be dealt with in parallel in many cases). In HEVC, the current specification results in a worst case throughput of 1.5625 context-coded bins per transform coefficient. This is calculated as follows:

Assume a 4×4 TU in which all 16 coefficients are non-zero and have a magnitude greater-than-one
1. 16 significant coefficient flags are context-coded
2. 8 greater-than-one flags are context-coded
3. 1 greater-than-two flag is context-coded (16+8+1)/16=1.5625

Tuple-based Coding

In accordance with one aspect of the present application, binary symbols are grouped into n-tuples (disjoint ordered sets of two or more symbols). The tuples may be context-coded, and information regarding the tuple may be exploited to improve or reduce the coding of the elements of the tuples (i.e. the binary symbols in the tuple). When symbols are sparsely distributed, n-tuples are efficient coding mechanisms. The ideas herein may be applied to coding of normal video, base, enhanced or both layers in scalable video, 3D-video coding, multi-view video coding, and other video coding schemes. It may also be applied to coding beyond video, including other media, like images and audio.

The tuple-based coding examples described below are applied to the coding of greater-than-one flags and significance flags. It will be appreciated that the tuple-based coding solution is more broadly applicable to coding of other binary symbols. In the context of video coding, and HEVC in particular, prediction unit flags, coding tree flags, or any other entropy-coded syntax element are example of binary symbols that may be coded using the tuple-based process described herein. In addition, non-binary symbols, if first binarized, may also be coded using n-tuple coding.

Some of the examples below divert bins that are usually context-coded to EP (equiprobable) bypass coding. It will be understood that the elements of a tuple need not be EP bypass coded and may, in other examples, be coded using other coding schemes, including Rice codes, Exponential Golumb coding, variable-to-variable (V2V) codes, or other such techniques.

In general, the tuple-based coding process begins with grouping binary symbols into n-tuples. An n-tuple i is a set of n elements denoted as $i<,>=<x_{ni}, x_{ni+1}, \ldots, x_{ni+n-1},>$. For example, if six binary symbols are grouped into pair-based tuples (n=2), then i=0, 1, or 2. As an example, i=2 is $<x_{ni}, x_{ni+1}>=<x_4, x_5>$. These example 2-tuples are disjoint ordered pairs of symbols, where the order is based upon the scan order within the transform unit or coefficient group.

A function is used to determine a tuple-based value for each tuple based on its elements and, in some cases, other relevant information, which may include statistics available at both the encoder and decoder. For example, the function f may be a linear combination:

$$f=\Sigma(a_j * x_j) \text{ for } j=\{ni, ni+1, \ldots ni+n-1\}$$

where $a_j$ are weights determined by the probability of a particular n-tuple, the probability of $x_j=1$ or some other factor. If $a_j=1/n$, then f is an average or, presuming equal probability in this example, the probability that a binary symbol equals 1. Other example functions f include the median, the minimum, or the maximum. The function f may also be a count, such as the number of 1s (or 0s) in the tuple. In another example, the function f may be a logical binary operation, such as the XOR of the elements of the tuple. The function f may be a mapping that uniquely identifies each n-tuple with an integer. For example, if n=3 and the elements are binary symbols, then the function f could be the binary representation of the integer obtained from concatenation of the ordered binary symbols of the tuple:

<0, 0, 0> maps to 0
<0, 0, 1> maps to 1
<0, 1, 0> maps to 2

In some cases, more than one function may be applied to the elements of the tuple to realize the tuple-based value. In some cases, additional information may be used to select a specific function. For example, the additional information may be used to select between two or more predefined functions. In another example, the additional information may be used to determine the weights $a_j$ applied in the function. Other functions and processes for determining a tuple-based value from the elements of the n-tuple will be appreciated in light of the foregoing description and the following examples.

The tuple-based value is encoded in the bitstream. The encoding of the tuple-based value may be context-based in some embodiments. Available relevant information may be used to determine a context, and that context may be adaptive (i.e. the associated probability is updated with each tuple-based value having that context). As an example, in the case of coding 2-tuples of greater-than-one flags for a coefficient group, the context for the 2-tuple may be based upon the value(s) of previously encoded/decoded 2-tuples, the numGreater1 variable (a variable in HEVC that is a geometrically decaying average of the number of coefficients that are greater than 1 in the transform unit), the number of greater-than-one flags that are equal to 1 in one or more previous coefficient groups, the number of significant flags that are equal to 1 in one or more previous coefficient groups, the number of significant flags (i.e. non-zero coefficients) in the current coefficient group, or the position of the elements (coefficients) of the current tuple in the current transform unit or coefficient group. A number of other possible factors may be used in determining the context for the current tuple.

Once the tuple is encoded or decoded, its value is used in the encoding/decoding of its elements. In many cases, the tuple-based value (and in some cases side information) determines one or more of the elements of the tuple. If the elements of a tuple are related, then n-tuple-based value encapsulates a measure of the correlation between those elements through the function used to create the tuple-based value. The n-tuple-based value may be used to infer the value of the contained elements in some cases, thereby avoiding the encoding/decoding of those elements. In other cases, the tuple-based value signals that one or more of the contained elements is to be encoding/decoded using another context, context set, mode, coding scheme, etc., which could be used to improve efficiency, reduce complexity, or both.

In one example implementations, the tuple-based coding does not replace existing coding models, but is conditionally used in place of one of the existing coding schemes. When the condition(s) is not met, the existing coding scheme is used. If the condition(s) is met, the tuple-based coding scheme is used. The condition may be applied at the level of a coefficient group, transform unit, coding unit, slice, frame, group-of-pictures, etc. In any implementation, the granularity of the switching between tuple-based coding and an existing coding model depends on the balance struck between being more adaptive (and thus possibly achieving better performance) and the computational cost of conducting condition checks more frequently. In the finest granularity, condition checks could be applied after each n-tuple.

2-tuple Encoding and Decoding Example: Greater-than-one Flags

In one example, tuple-based coding is used to encode and decode greater-than-one flags. As noted above, current HEVC proposals would restrict coding of greater-than-one flags to a maximum of eight per transform unit.

Figure 4:
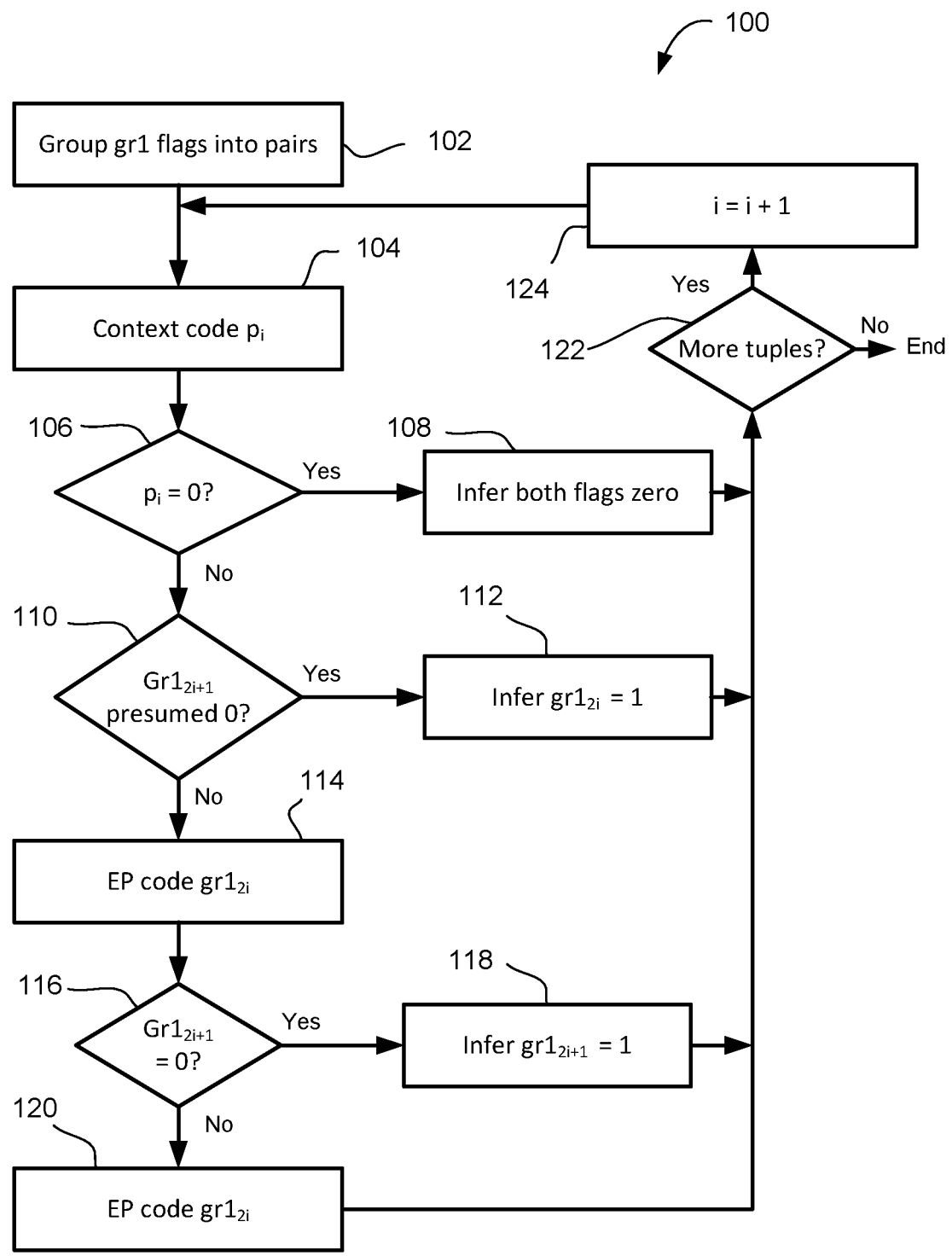
FIG. 4 shows one example process for tuple-based encoding of greater-than-one flags.

Reference is now made to FIG. 4, which illustrates in flowchart form an example process 100 for encoding greater-than-one flags using tuple-based coding. The process 100 in this example is applied on a coefficient group basis, although in other embodiments it could be applied per transform unit, per coding unit, per frame, per slice, etc. depending on the applicable standard.

The process 100 begins with grouping of greater-than-one flags into pairs in operation 102. The grouping may be implemented by forming a 2-tuple (disjoint ordered pair —i.e. non-overlapping pairs formed in order) using the first two greater-than-one flags encountered in the transform unit in (reverse) scan order. Subsequent pairs may be formed in subsequent iterations of the process 100 if additional greater-than-one flags remain in the coefficient group. If there are an odd number of greater-than-one flags, then the last flag in the (reverse) scan order is the first element of a tuple that contains a dummy or zero element as the second element. The dummy or padding element need not be actually encoded/decoded because both the encoder and decoder know the total number of greater-than-one flags based on the significance map.

In operation 104, a tuple-based value is encoded for the tuple. The tuple-based value is a function of the elements of the tuple. In this example, for the $i^{th}$ pair the tuple-based value, $p_i$, is given by:

$$p_i=(gr1_{2i}+gr1_{\{2i+1\}}>0)?1:0$$

That is, the tuple-based value in this example is based on a logical OR: if either or both of the elements is 1 then the tuple-based value is 1, otherwise it is zero.

The tuple-based value may be encoded in operation 104 using any selected coding scheme. In this example, the tuple-based value is context coded. Further details regarding an example embodiment of a context model for coding $p_i$ are given later below.

In operation 106, the encoder determines whether the tuple-based value is zero. If so, then it is known (i.e. the encoder infers) that both elements of the tuple are zero, as indicated by operation 108. Thus, the encoder does not need to encode anything further for the tuple in order for the decoder to completely decode the elements based on the context-coded tuple-based value of 0.

If the tuple-based value $p_i$ is non-zero, then in operation 110, the encoder assesses whether it can presume that the second element, $gr1_{\{2i+1\}}$, is zero. This may occur, for example, if there are an odd number of greater-than-one flags, meaning that the encoder and decoder both know that the second element of the last tuple is zero. In this case, the tuple-based value of the last tuple uniquely identifies the value of the first element. Accordingly, in operation 112, the greater-than-one flag $gr1_{2i}$ is inferred to be zero and need not be encoded.

If the second element cannot be presumed to be zero, then in operation 114 the encoder EP bypass codes the first element $gr1_{2i}$. Although this example process 100 uses EP bypass coding other non-context-based coding schemes could be used in other embodiments.

The encoder then assesses whether the first element $gr1_{2i}$ is zero in operation 116. If so, then the encoder is able to infer from the tuple-based value $p_i$ that the second element, $gr1_{\{2i+1\}}$, is 1, and thus it does not need to encode the second element, as indicated in operation 118.

If, however, the first greater-than-one flag in the tuple is 1, then the value of the second element cannot be inferred and it needs to be encoded, as indicated by operation 120. The second element is EP bypass coded in this example.

The process 100 then determines whether additional tuples (pairs, in this case) remain to be encoded in operation 122. If so, then the index i is incremented in operation 124 and the process 100 returns to operation 104. Otherwise, it ends.

Figure 5:
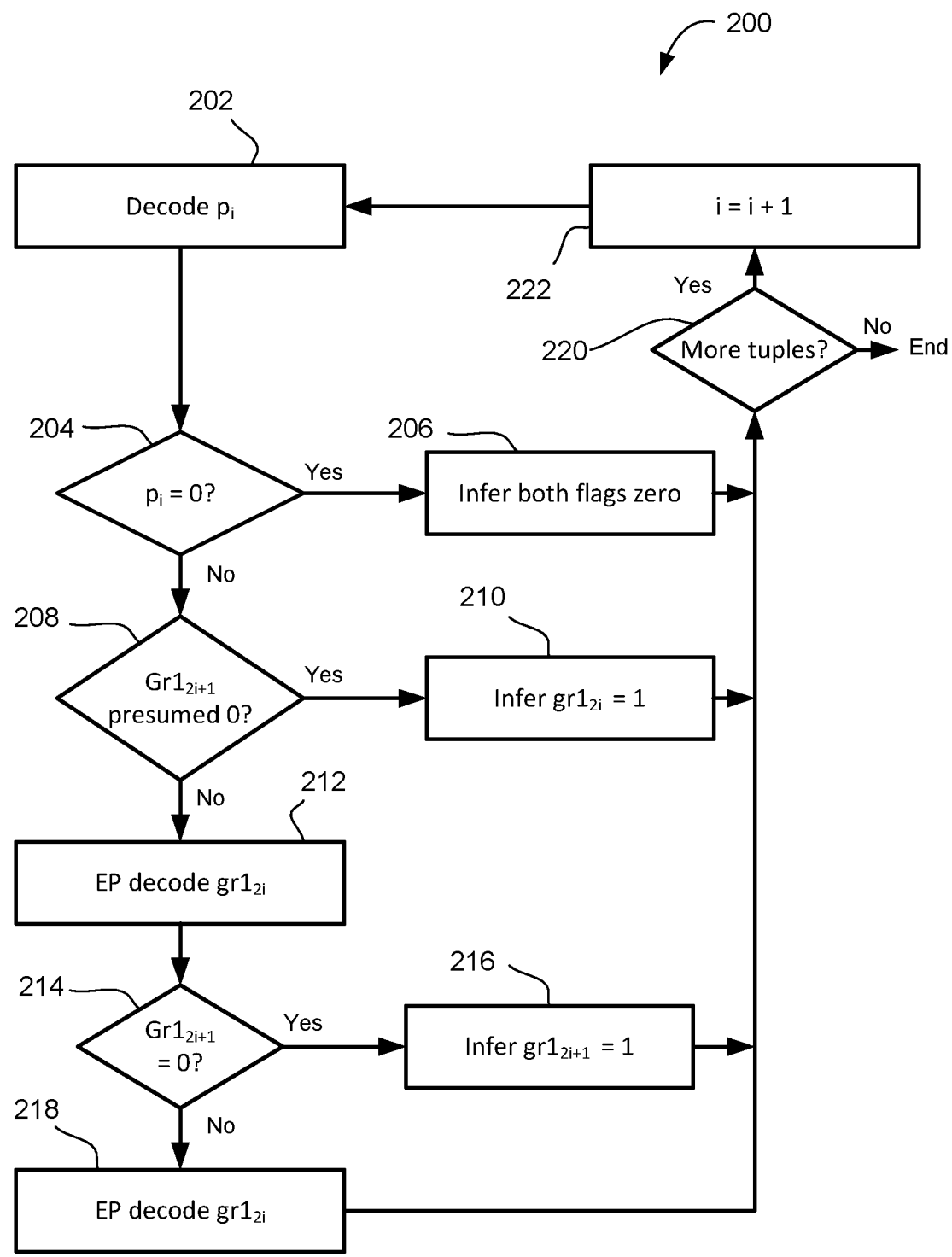
FIG. 5 shows a corresponding example process for tuple-based decoding of greater-than-one flags.

An example of a corresponding decoding process 200 is shown in flowchart form in FIG. 5. The process 200 includes decoding of a tuple-based value $p_i$ from the bitstream in operation 202, where i is an index to the number of tuples. The decoding may be context-based, in some examples. An example context model for coding/decoding of tuple-based values will be described later below. It will be appreciated that the decoder will have already decoded a significance map for the transform unit or coefficient group, as the case may be. The significance map identifies the location of the non-zero coefficients. The significant coefficient flags equal to 1 identify the positions for which there are greater-than-one flags. Accordingly, it will be understood that non-overlapping pairs of non-zero coefficients have corresponding non-overlapping pairs of greater-than-one flags, i.e. tuples, as described herein.

In operation 204, the decoder assesses whether the decoded tuple-based value $p_i$ is zero. If so, then it knows that both elements of the tuple are zero because the function used to determine the tuple-based value would have been a logical OR (in this example). Accordingly, in operation 206 the decoder infers (sets) the both greater-than-one flags, $gr1_{2i}$ and $gr1_{\{2i+1\}}$, to zero.

If the decoded tuple-based value is non-zero, then in operation 208 the decoder determines whether the second element may be presumed to be zero (for example, because it is dealing with the last tuple and there are an odd number of greater-than-one flags). If so, then in operation 210, the decoder infers (sets) the first element, greater-than-one flag $gr1_{2i}$, to 1.

If that presumption cannot be made, then in operation 212 the decode EP decodes the first greater-than-one flag $gr1_{2i}$ of the tuple from the bitstream. In operation 214 the decoder assesses whether the decoded greater-than-one flag $gr1_{2i}$ is zero. If so, then the decoder can infer (set) the second greater-than-one flag of the tuple, $gr1_{\{2i+1\}}$, to 1, as indicated by operation 216. If not, then the decoder EP decodes the second greater-than-one flag $gr1_{\{2i+1\}}$ from the bitstream.

After the tuple of greater-than-one flags has been decoded or inferred (in some cases one element may be decoded and the other inferred, like in operation 216), then in operation 220 the decoder determines whether there are any additional tuples to be decoded. If so, then in operation 222 the index i is incremented, that the decoder returns to operation 202 to decode the next tuple-based value from the bitstream. Otherwise, the process 200 ends.

Figure 6:
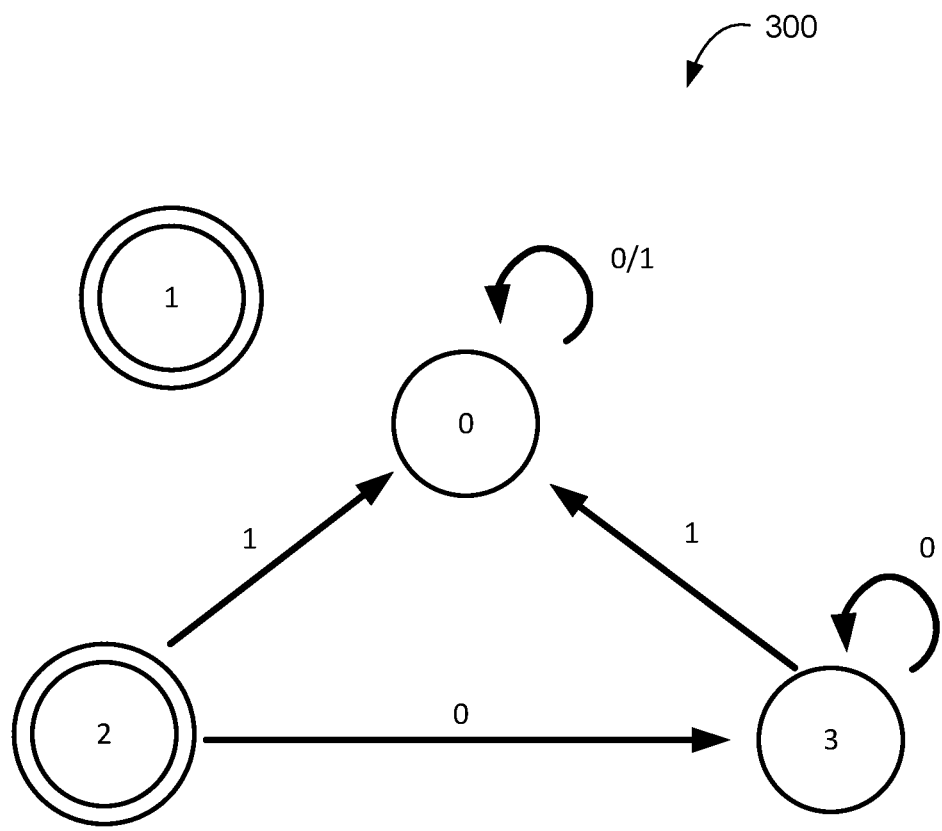
FIG. 6 shows an example state machine for context derivation for encoding/decoding tuple-based values in the processes of FIGS. 4 and 5.

The context model used to encode or decode the tuple-based values may, in one example embodiment, include four contexts. The model may further include multiple context sets each having four contexts. The context set may be selected based upon the picture type (luma or chroma), the region of the transform unit in which the coefficient group is located, and/or other factors. The context within a context set may be determined using a state machine, such as the example state machine 300 shown in FIG. 6.

In the example state machine 300, there is a distinct context, context 1, for cases in which there is a single greater-than-one flag to be coded/decoded in the tuple. In other cases, the first context is context 2, following which the machine moves to context state 3 if the tuple-based value is zero, and it stays in that context until a tuple-based value of 1 is encountered. A tuple-based value of 1 causes the machine to transition to context 0, where it remains until reset. The state machine may be reset to context 2 at the beginning of each transform unit, coding unit, frame, slice, or at other granularities.

It will be appreciated that the foregoing example 2-tuple coding process for greater-than-one flags results in a worst throughput (as defined earlier) of 1.3125 versus 1.5625 for current HEVC processes. This occurs by diverting context-coded greater-than-one flags to EP coding and coding a maximum of four context-coded tuple-based values per coefficient group. The throughput is thus given by (16+4+1)/16=1.3125.

In one variation on the above-describes processes, the coding of the tuple-based values and elements are de-interleaved. That is, all the tuple-based values are context-coded. Then the first elements, $gr1_{2i}$ are EP encoded where the tuple-based value equals 1 and the second element cannot be presumed to be zero. Then the second elements, $gr1\{2i+1\}$, are EP encoded for each tuple in which the first element has been encoded and the first element is equal to 1.

Advantageously, the EP coded bypass bins (greater-than-one flags) may be decoded in parallel because the context-coding does not impose a throughput restriction. All the $gr1_{2i}$ bins may be decoded in one cycle and all the $gr1_{\{2i+1\}}$ bins decoded in the next cycle.

The following pseudo-code illustrates one example implementation of the 2-tuple greater-than-one flag decoding method in a video decoding process. In this example, a single sign bit is hidden per coefficient group. The condition for sign bit hiding is the number of non-zero coefficients in the group, unless it is the last coefficient group in the transform unit.

It will be noted that some details of the decoding process have been omitted where they are not germane to the description of the present example of coefficient level reconstruction.

```
residual_coding( x0, y0, log2TrafoWidth, log2TrafoHeight, scanIdx, cIdx ) {                                                Descriptor
   ...//decode last significant coefficient position
   ...//decode significant coefficient group flags
      numSigCoeff = 0
      for( n = 15; n >= 0; n-- ) {
         xC = ScanOrder[ log2TrafoWidth ][ log2TrafoHeight ][ scanIdx ][ n + offset ][ 0 ]
         yC = ScanOrder[ log2TrafoWidth ][ log2TrafoHeight ][ scanIdx ][ n + offset ][ 1 ]
         if( (n + offset) < (numCoeff - 1) && significant_coeff_group_flag[ xCG ][ yCG ] &&
             ( n > 0 || implicitNonZeroCoeff == 0 ) ) {
            significant_coeff_flag[ xC ][ yC ]                                                                              ae(v)
            if( significant_coeff_flag[ xC ][ yC ] == 1 )
               implicitNonZeroCoeff = 0
         }
         if( significant_coeff_flag[ xC ][ yC ] == 1 )
            numSigCoeff ++
      }
      numGreater1Flags = min(numSigCoeff, 8)
      for( n = (numGreater1Flags >> 1) - 1; n >= 0; n-- )
         coeff_abs_level_greater1_pair_flag[ n ]                                                                            ae(v)
      if( coeff_abs_level_greater1_pair_flag[ 0 ] || coeff_abs_level_greater1_pair_flag[ 1 ] ||
coeff_abs_level_greater1_pair_flag[ 2 ] || coeff_abs_level_greater1_pair_flag[ 3 ] )
         coeff_abs_level_greater2_flag                                                                                      ae(v)
      for( n = (numGreater1Flags >> 1) - 1; n >= 0; n-- ) {
         if( coeff_abs_level_greater1_pair_flag[ n ] == 1 )
            coeff_abs_level_greater1_flag[ (n << 1) + 1 ]                                                                   ae(v)
      }
      for( n = (numGreater1Flags >> 1) - 1; n >= 0; n-- ) {
         if( coeff_abs_level_greater1_flag[ (n << 1) + 1 ] == 1 && !( n == 0 && (numGreater1Flags &
1) == 1 ) )
            coeff_abs_level_greater1_flag[ n << 1 ]                                                                         ae(v)
      }
      firstNZPosInCG = 16
      lastNZPosInCG = -1
      numSigCoeff = 0
      firstGreater1CoeffIdx = -1
      coeff_abs_level_greater1[16] = {0, 0, ..., 0}
      coeff_abs_level_greater2[16] = {0, 0, ..., 0}
      for( n = 15, m = numGreater1Flags - 1; n >= 0; n-- ) {
         xC = ScanOrder[ log2TrafoWidth ][ log2TrafoHeight ][ scanIdx ][ n + offset ][ 0 ]
         yC = ScanOrder[ log2TrafoWidth ][ log2TrafoHeight ][ scanIdx ][ n + offset ][ 1 ]
         if( significant_coeff_flag[ xC ][ yC ] ) {
            if( numSigCoeff < 8 ) {
               coeff_abs_level_greater1[ n ] = coeff_abs_level_greater1_flag[ m ]
               m--
               numSigCoeff++
               if( coeff_abs_level_greater1[ n ] && firstGreater1CoeffIdx == -1 )
                  firstGreater1CoeffIdx = n
            }
            if( lastNZPosInCG == -1)
               lastNZPosInCG = n
            firstNZPosInCG = n
         }
      }
      signHidden = ( lastNZPosInCG - firstNZPosInCG >= sign_hiding_threshold) ? 1 : 0
      if( firstGreater1CoeffIdx != -1 )
         coeff_abs_level_greater2[ firstGreater1CoeffIdx ] = coeff_abs_level_greater2_flag
   ...//decode sign bits
   ...//decode remaining level data
   }
}
```

In terms of semantics, the following variables used in the pseudo-code above may have the following properties.

coeff_abs_levelgreater1_pair_flag[n] specifies for the n-th pair of positions in which there are non-zero transform coefficients whether there are transform coefficient levels greater than 1. When coeff_abs_level_greater1_pair_flag[n] is not present, it is inferred to be equal to 0.

coeff_abs_level_greater1_flag[n] specifies for the scanning position n in which there is a non-zero transform coefficient whether there are transform coefficient levels greater than 1. When coeff_abs_level_greater1_flag[n] is not present, it is inferred to be equal to 0.

coeff_abs_level_greater2_flag specifies for the last scanning position in which there is a non-zero transform coefficient whether there are transform coefficient levels greater than 2. When coeff_abs_level_greater2_flag is not present, it is inferred to be equal to 0.

In one example embodiment, the context derivation process for determining the context for encoding the pair value may include the following operations. Inputs to this process are the colour component index cIdx, the 16 coefficient subset index i, the pair n of syntax elements coeff_abs_level_greater1_flag within the current subset, and the number of non-zero transform coefficients in subset index i. Output of this process is ctxIdxInc.

The variable ctxSet specifies the current context set and for its derivation the following applies:
  1. If n is equal to 3 or all previous syntax elements coeff_abs_level_greater1_pair_flag[p] with p greater than n are derived to be equal to 0 instead of being explicitly parsed, the following applies:
  a. The variable ctxSet is initialized by, if the current subset index i is equal to 0 or cIdx is greater than 0, set ctxSet=0. Otherwise (i is greater than 0 and cIdx is equal to 0), set ctxSet=2.
  b. When the subset i is not the first one to be processed in this subclause, the following applies:
    i. The variable numGreater1 is set equal to the variable numGreater1 that has been derived during the last invocation of subclause 9.2.3.1.6 for the syntax element coeff_abs_level_greater2_flag for the subset i+1.
    ii. When (numGreater1>>1) is greater than 0, ctxSet is incremented by one.
  c. When there is only one non-zero transform coefficient in the subset i, the variable greater1PairCtx is set equal to 1. Otherwise, the variable greater1PairCtx is set equal to 2.
2. Otherwise (coeff_abs_level_greater1_pair_flag[n] is not the first to be parsed within the current subset i), for the derivation of ctxSet and greater1Ctx the following applies:
  a. The variable ctxSet is set equal to the variable ctxSet that has been derived during the last invocation of this subclause.
  b. The variable greater1Ctx is set equal to the variable greater1Ctx that has been derived during the last invocation of this subclause.
  c. When greater1PairCtx is greater than 0, the variable lastGreater1PairFlag is set equal to the syntax element coeff_abs_level_greater1_pair_flag that has been used during the last invocation of this subclause and greater1PairCtx is modified as follows:
    i. If lastGreater1PairFlag is equal to 1, greater1PairCtx is set equal to 0.
    ii. Otherwise (lastGreater1PairFlag is equal to 0), greater1PairCtx is incremented by 1.

The context index increment ctxIdxInc is derived using the current context set ctxSet and the current context greater1PairCtx as follows:

ctxIdxInc=(ctxSet*4)+Min(3, greater1PairCtx)

When cIdx is greater than 0, ctxIdxInc is modified as follows:

ctxIdxInc=ctxIdxInc+16

It will be appreciated that the foregoing pseudo-code and semantics present one example embodiment, and that the present application is not limited to this specific embodiment.

2-tuple Encoding and Decoding Example: Significance Flags

In this next example, tuple-based coding is used to encode and decode significant-coefficient flags. As noted above, current HEVC proposals involve coding up to sixteen significant-coefficient flags per coefficient group.

Figure 7:
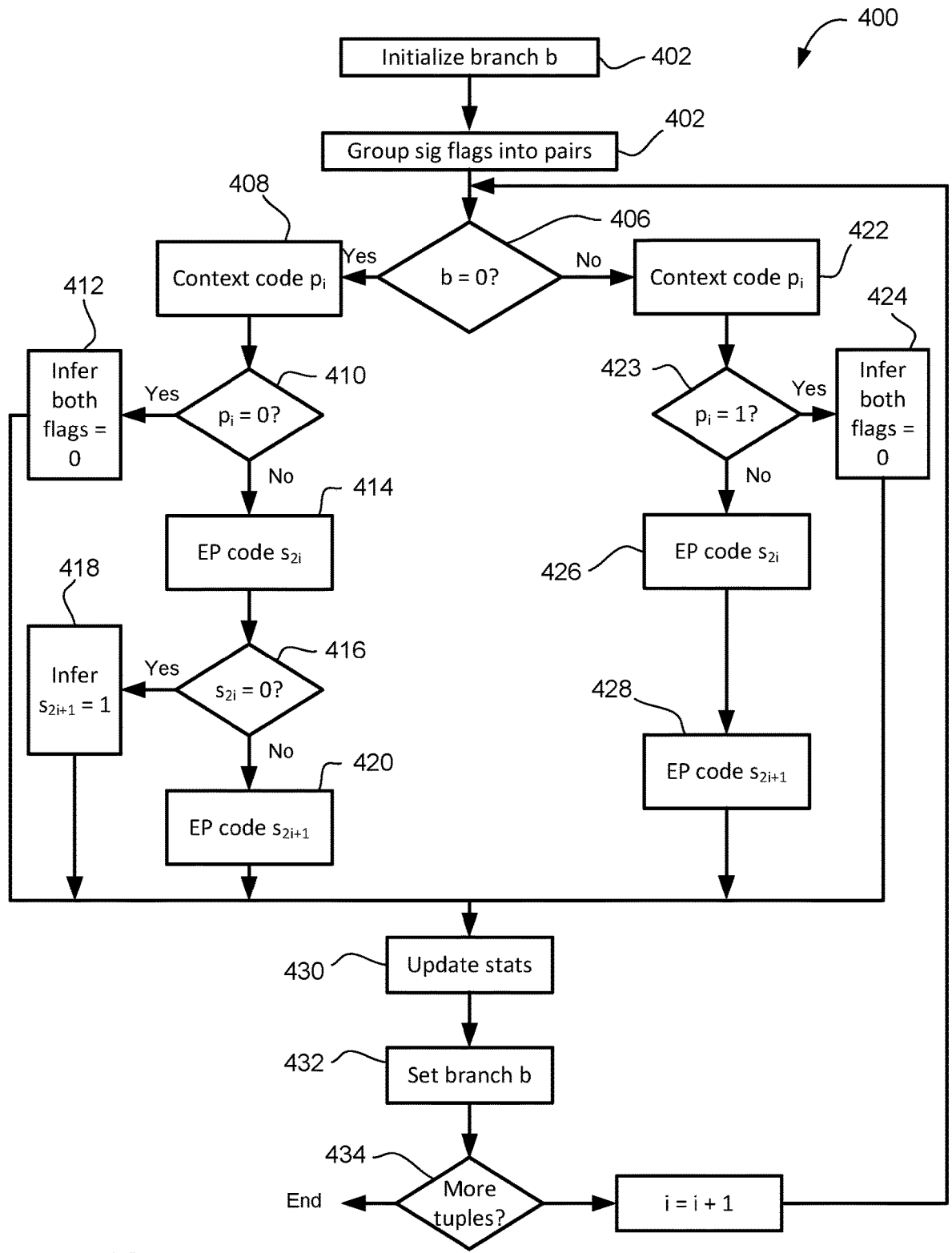
FIG. 7 shows an example method for tuple-based encoding of significant-coefficient flags.

Reference is now made to FIG. 7, which illustrates in flowchart form an example process 400 for encoding significant-coefficient flags using tuple-based coding. The process 400 in this example is applied on a coefficient group basis, although in other embodiments it could be applied per transform unit, per coding unit, per frame, per slice, etc. depending on the applicable standard.

The process 400 uses two branches, identified or selected using the variable b, which can take the values 0 and 1. In this example process 400, the variable b is initialized in operation 402. The branch variable may be initialized depending on the region in which the coefficient group resides, the size of the TU and statistics derived from any previously-coded coefficient groups. For example, if the number of significant-coefficient flags=1 in the previous coefficient group is greater than a threshold, initialize the branch to 1, otherwise, initialize it to 0. The significant-coefficient flags are then grouped into 2-tuples in operation 404. As noted previously, each 2-tuple is a disjoint pair of significant-coefficient flags formed in scan order.

At operation 406, the encoder determines whether to use the first branch or the second branch based on the value of variable b.

The first branch includes operations 408 through 420. Operation 408 is the context coding of the tuple-based value $p_i$. The tuple-based value may be realized through a suitable function of the elements of the tuple. In this example, the tuple-based value $p_i$ is a logical OR, which may be expressed as:

$$p_i = (s_{2i} + s_{\{2i+1\}} > 0)?1:0$$

In this expression the significant-coefficient flags in the tuple are $s_{2i}$ and $s_{\{2i+1\}}$ the tuple-based value is zero, as assessed in operation 410, then the encoder is able to infer that both significant-coefficient flags are zero, and nothing further need be encoded, as indicated by operation 412. If, however, the tuple-based value is non-zero, then in operation 414 the first significant-coefficient flag $s_{2i}$ is encoded using EP bypass coding, in this example.

If the first significant-coefficient flag is zero, as assessed in operation 416, then the encoder can infer that the second significant-coefficient flag is 1, as indicated by operation 418. Otherwise, the second significant-coefficient flag is encoded using EP bypass coding, as indicated by operation 420.

The second branch will now be described, which is reflected in operations 422 through 428. The second branch is different in that it uses a different function to realize a tuple-based value $p_i$. In operation 422, the tuple-based value is determined and context encoded. In this case, the tuple-based value is determined as the logical AND of the significant-coefficient flags. This may be expressed as:

$$p_i = (s_{2i} == s_{\{2i+1\}} == 1)?1:0$$

If the tuple-based value is found to equal 1 in operation 423 then the encoder can infer that both significant-coefficient flags in the tuple are 1, as indicated by operation 424, and nothing further need be encoded. Otherwise, both significant-coefficient flags are encoded, as indicated by operations 426 and 428.

The branch used for encoding a tuple may be selected based upon the expected probability that the significant-coefficient flags equal 1. If the likelihood that the significant-coefficient flag=1 is high, then the second branch may result in more effective compression. If the likelihood of the significant-coefficient flag=0 is high, then the first branch may result in more effective compression.

Irrespective of the branch used, in operation 430 the statistics gathered for the current coefficient group (and/or transform unit) are updated based upon the encoded tuple of significant-coefficient flags. For example, the encoder may track the number of significant-coefficient flags=1 in the current coefficient group (and/or transform unit), and the number of tuple-based values=1 in the coefficient group (and/or transform unit) perhaps broken down into first branch and second branch.

The branch for encoding the next tuple is selected in operation 432. The selection may be based on the statistics updated in operation 430. In one example, values $k_1$ and $M_1$ and $k_0$ and $M_0$ may be used to control the switching mechanism. The selection, in one example, may be made as follows:

If at least $k_1$ out of the last $M_1$ significant-coefficient flags=1, set b=1

If at least $k_0$ out of the last $M_0$ significant-coefficient flags=0, set b=

The threshold values $k_1$, $M_1$, $k_0$, and $M_0$ may be fixed or adaptive.

In operation 434 the encoder determines whether any significant coefficient pairs remain and, if so, it increments the index i in operation 436 and returns to operation 406.

The context model used to code the pair values in the multi-branch solution may be the same as the context model for a single-branch solution. Alternatively, the context model can mirror the context model for significance flags in the current HEVC design. That is, $p_i$ has the same number of contexts as the significance-coefficient flags, and the context used to code $p_i$ is selected identically as the context that would otherwise have been used to code $s_{\{2i\}}$.

In one variation on the above example, the decision to use one or the other of the branches is made at the coefficient group level instead of at the tuple level. The decision is made based on a threshold number of the significant-coefficient flags=1 in the previous coefficient group(s) and/or neighboring coefficient group(s). This threshold can be fixed or dynamic. Another piece of information that can be used is the position of the current coefficient group within the TU, e.g. lower frequency coefficient groups have a lower threshold than higher frequency coefficient groups.

In one example, such as the current HEVC design, each coefficient group contains 0 or 16 significance flags for transform coefficients. However, if there are an odd number of elements to code (e.g., if this solution is used in another application), the last pair value is the value of the last element. Thus, (de)coding can terminate immediately after that value is (de)coded.

In the multi-branch solution described above, context-coded and bypass bins are interleaved. In order to be able to de-interleave them for faster processing speed, the encoder/decoder may switch between branches based on a threshold of pair values, instead of individual elements.

Although there is not a data dependency problem in significant-coefficient flag coding, this solution does improve the worst case throughput. In the worst case, there are 8, 8 and 1 context-coded bins for significant-coefficient flags, greater-than-one flags and greater-than-two flags, respectively, in a 4×4 TU. This amounts to a worst case throughput of 17/16=1.0625. If the proposed n-tuple coding methods described above are applied to both significant-coefficient flags and greater-than-one flags, the worst case throughput becomes 13/16=0.8125.

Coding Model Selection

In one embodiment, the encoder and decoder implement both a tuple-based coding model and a more conventional video coding model, and they dynamically select between these two models. Using, for example, the 2-tuple coding model described above for greater-than-one flags, the selection may be based on assessment of whether the tuple-based model fits current probability distributions. In particular, the n-tuple model is efficient when the greater-than-one flags are mostly zero and, if a given tuple-based value is 1, then the probability of the first greater-than-one flag being 1 (or 0) is about 0.5 (since EP coding is used). In cases, where these conditions are not generally applicable, the conventional HEVC coding model may be more efficient.

The probably of a tuple-based value being equal to zero may be defined as p. Then q is defined as the probability that the first greater-than-one flag in the tuple is 1. That is, $p=\Pr\{p_i=0\}$ and $q=\Pr\{gr1_{2i}=0|p_i=1\}$. The n-tuple coding model is advantageous under this scenario when:

$$p*1+(1-p)(q*2+(1-q)*3)<2$$

This inequality may be derived as follows. In the n-tuple coding model, if $p_i=0$, a single (context-coded) bin is required to code the pair of greater-than-one flags. This happens with probability p. Otherwise, $p_i=1$ with probability (1−p) and either two or three bins are required to code the pair of gr1 flags. Two bins (1 context-coded bin for the tuple-based value and 1 EP bin for the first greater-than-one flag) are required if $gr1_{\{2i\}}=0$ and $p_i=1$ (probability q*(1−p)) while three bins (1 context-coded bin for the tuple-based value and 2 EP bins for the greater-than-one flags) are required if $gr1_{\{2i\}}=1$ and $p_i=1$ (probability (1−q)*(1−p)). On the other hand, in the HEVC coding model, 2 (context-coded) bins are required to code a pair of greater-than-one flags.

This inequality provides an example rule to determine how to switch between the two coding models. When p and q are such that the condition is true, use the n-tuple coding method; otherwise, use the HEVC coding method. p and q are statistics that can be easily collected and updated by both the encoder and decoder. In one embodiment, we assume that q=½, meaning that only one statistic needs to be maintained, p, and the condition above becomes p>=⅓.

When we switch between the coding models may be an implementation decision. At the finest granularity, the encoder and decoder may switch between the HEVC and n-tuple coding models on a pair-by-pair basis. Theoretically, this will provide the most coding efficiency gain. However, in practice, certain implementations may prefer to limit switching in order to keep complexity low. Instead of checking whether to switch between coding models after each pair of greater-than-one flags, certain implementations can do this on a coefficient group by coefficient group basis. To further reduce complexity, other implementations will perform the check and potentially switch coding models after a certain number of coefficient groups, such as after pre-defined regions in the TU. For example, in one embodiment, the encoder and decoder potentially switch the coding model only twice per TU: once before processing the highest frequency coefficient group (i.e., at the start of the TU) and once at the beginning of the lowest frequency coefficient group (the coefficient group containing the DC).

3-tuple Encoding and Decoding Example

Figure 8:
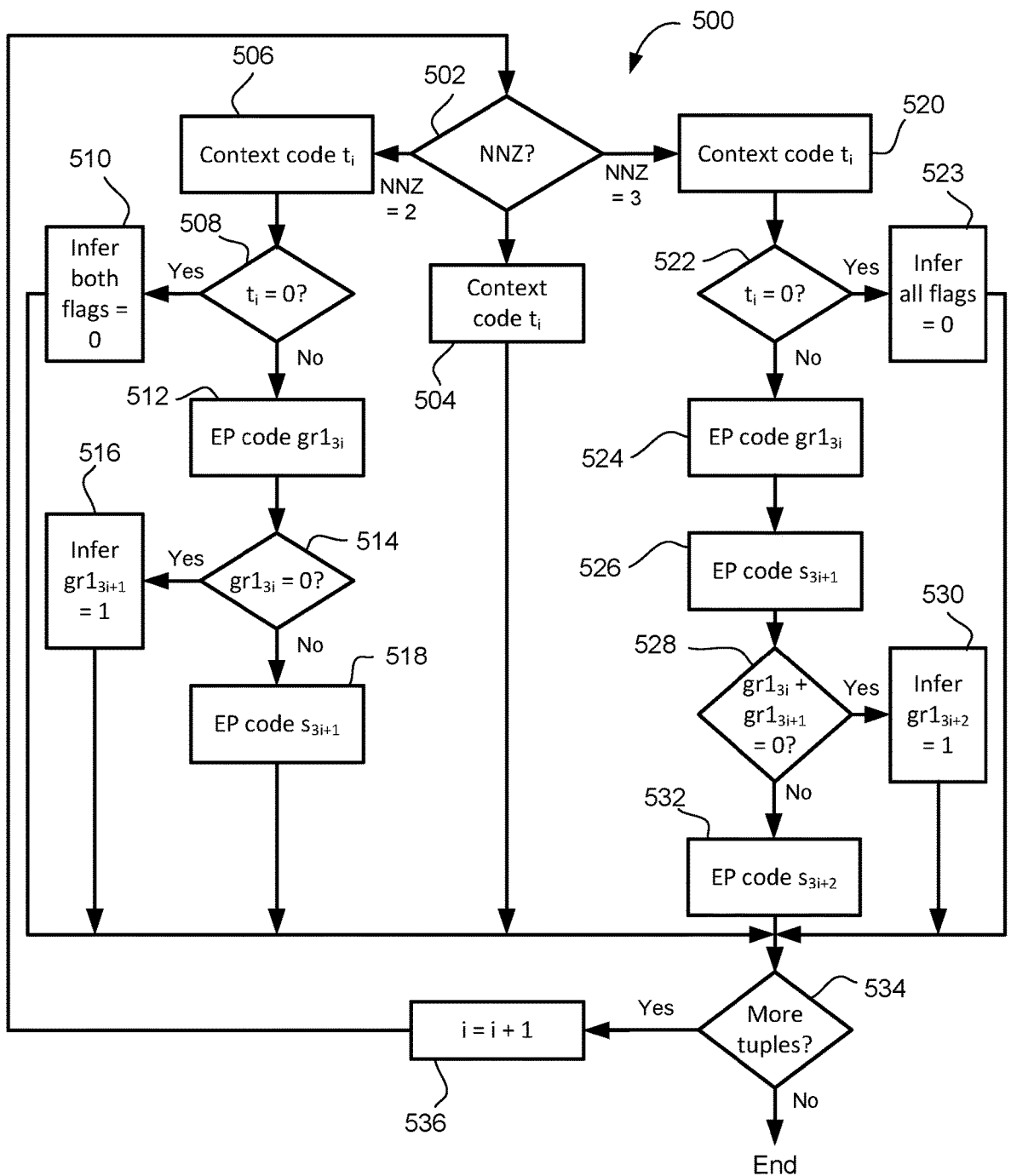
FIG. 8 shows an example method of 3-tuple-based encoding of greater-than-one flags.

In yet another example of tuple-based coding, the encoder and decoder may use 3-tuples, each containing three greater-than-one flags. An example encoding process 500 is shown in flowchart form in FIG. 8. This process 500 has multiple branches, the selection of which depends on the number of non-zero coefficient left in the coefficient group.

In operation 502, the number of non-zero (NNZ) coefficients remaining is checked. If just one NNZ is left, then in operation 504 the tuple-based value (which is denoted $t_0$ in this example) is context encoded. In this case, the tuple-based value is the value of the only greater-than-one flag in the 3-tuple. The other two elements of the tuple are padding/zeros.

If the NNZ is equal to two, then the 3-tuple contains two elements and a zero to pad the tuple to three elements: $<gr1_{3i}, gr1_{\{3i+1\}}, 0>$. The tuple-based value is given by:

$t_0=(gr1_{3i}+gr1_{\{3i+1\}}>0)$? 1:0, which is effectively a logical OR operation. This value is context encoded in operation 506.

In operation 508, the encoder assesses whether the tuple-based value is zero. If so, then both elements may be presumed to be zero, as indicated by operation 510, and nothing further need be encoded. If, however, the tuple-based value is 1 then in operation 512 the first greater-than-one flag, $gr1_{3i}$ is EP bypass encoded. In operation 514, the encoder assesses whether the first greater-than-one flag is zero. If so, then the second greater-than-one flag is known to be 1, as indicated by operation 516 and nothing further need be encoded. Otherwise, in operation 518, the second greater-than-one flag is EP bypass encoded.

If at operation 502 it is determined that there are more than two NNZ coefficients left in the coefficient group, then the encoder employs the process shown in operations 520 to 536. In particular, in this example, the encoder context encodes the tuple-based value $t_i$ in operation 520, where the tuple-based value is given by:

$$t_i=(gr1_{3i}+gr1_{\{3i+1\}}+gr1_{\{3i+2\}}>0)?1:0$$

It will be appreciated that this example function for determining the 3-tuple's tuple-based value is a logical OR. If any of the greater-than-one flags in the tuple are 1 then the tuple-based value is 1; otherwise, it is zero. Other functions may be used in other embodiments. In some embodiments different functions may be used based on a multi-branch process, such as that described in connection with FIG. 7.

In operation 522, the encoder assesses whether the tuple-based value is zero. If so, then it may assume that all elements, i.e. all three greater-than-one flags, are zero as indicated by operation 523. In that case, nothing further need be encoded. If not, then the encoder goes on to encode the first and second greater-than-one flags, as indicated by operations 524 and 526, respectively.

In operation 528, the encoder determines whether the first and second greater-than-one flags are both zero. If so, then it may assume that the third greater-than-one flag in the tuple is equal to 1 and nothing further need be encoded, as indicated by operation 530. Otherwise, it encodes the third greater-than-one flags in operation 532.

The encoder then assesses whether there are further tuples to encode in operation 534. If there are, then it increments the tuple index i in operation 536 and returns to operation 502.

Figure 9:
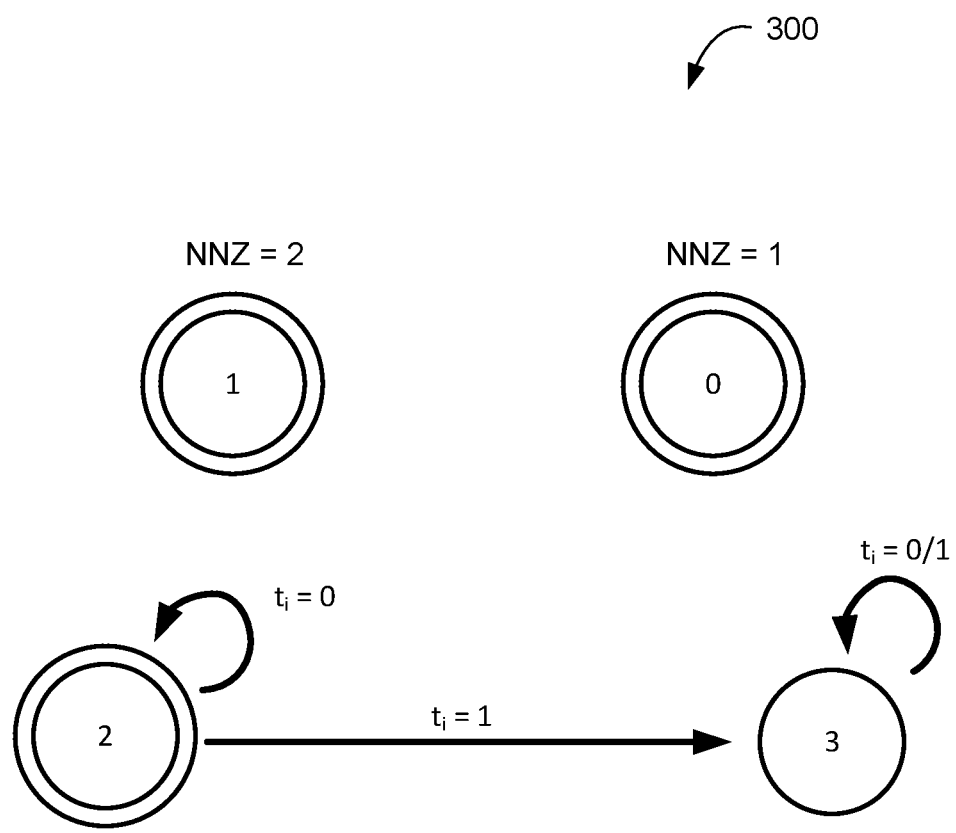
FIG. 9 shows an example state machine for determining context for encoding/decoding tuple values in the process shown in FIG. 8.

The context used for encoding the tuple-based value in this example may be selected party based upon the number of non-zero coefficient remaining in the coefficient group. FIG. 9 illustrates one example embodiment of a state machine 600 for selecting context in this example encoding process. In this example, a fixed context, context 0, is used for encoding the tuple-based value in the case where there is only one non-zero coefficient remaining in the coefficient group, i.e. where the tuple only includes one greater-than-one flag. Similarly, context 1 is used to encode the tuple-based value when only two non-zero coefficients remain in the coefficient group.

If there are more than two greater-than-one flags still to be encoded for the coefficient group, then the context selected starts with context 2. If a tuple-based value of 1 is encountered, then the encoder moves to context 3, where it remains unless it needs to switch to context 1 or 0 due to the number of non-zero coefficients remaining.

Fixed Grouping of Greater-than-one Flags

In all the embodiments discussed thus far, greater-than-one flags are only present if the corresponding significant coefficient indicates a non-zero coefficient in that position. As a result, the grouping of greater-than-one flags (e.g. the pairing in the case of 2-tuples) depends on the significance map. In some embodiments, the number of greater-than-one flags may also be limited to a maximum number per coefficient group, such as 8. In that case, the maximum 8 greater-than-one flags may appear in any of the sixteen positions within the coefficient group, depending upon which coefficients happen to be non-zero in that coefficient group. In other words that are C(16, 8) combinations for a given n-tuple grouping.

In this embodiment, the grouping of greater-than-one flags is independent of the significance map. A greater-than-one flag is defined for every coefficient position. This new greater-than-one flag is denoted gr1' herein. It replaces the gr1 flag discussed above. A $gr1_i'$ flag for transform coefficient $x_i$ is defined as follows:

$gr1_i'=0$ if $x_i \leq 1$ $gr1_i'=1$ if $x_i > 1$

Therefore, there are exactly 16 gr1' flags in a coefficient group. Every n consecutive gr1' flags in scan order are grouped as an n-tuple. If the grouping is pairwise, i.e. n=2, there will be 8 pairs.

Each tuple is coded by encoding a tuple-based value. The tuple-based value is determined partly based on the significance map. In other words, the significance map is used as side information for determining the tuple-based value or the meaning of the tuple-based value. Each n-tuple has n gr1' flags and, thus, n significant-coefficient flags.

Using a 2-tuple as an example, the significant-coefficient flags may be used to interpret the tuple-based value as follows:

1. If both significant-coefficient flags=0, code nothing since both significant-coefficient flags are zero and, thus, both gr1' flags can be inferred to be zero.
2. If one significant-coefficient flag=0, then the value of the corresponding gr1' flag can be inferred to be zero and the tuple-based value is equal to the value of the other gr1' flag (that has a corresponding significant-coefficient flag=1).
3. If both significant-coefficient flags=1, then the coding process follows the techniques set out in one of the above-described embodiments for coding gr1 flags. That is the tuple-based value is some function of the gr1' flags within the tuple, such as a logical OR or a logical AND of the flags.

One possible advantage of the above-described embodiment is that a fixed grouping of tuples is used. Accordingly, the tuples contain gr1' flags that are contiguous in scan order and are, therefore, likely to be close together in the coefficient group (depending on the scan order). If tuples are formed from gr1 flags, the tuples may contain flags that are separated by a significant distance. It will be appreciated that this may result in a poor correlation between the gr1 flags in such a tuple.

Figure 10:
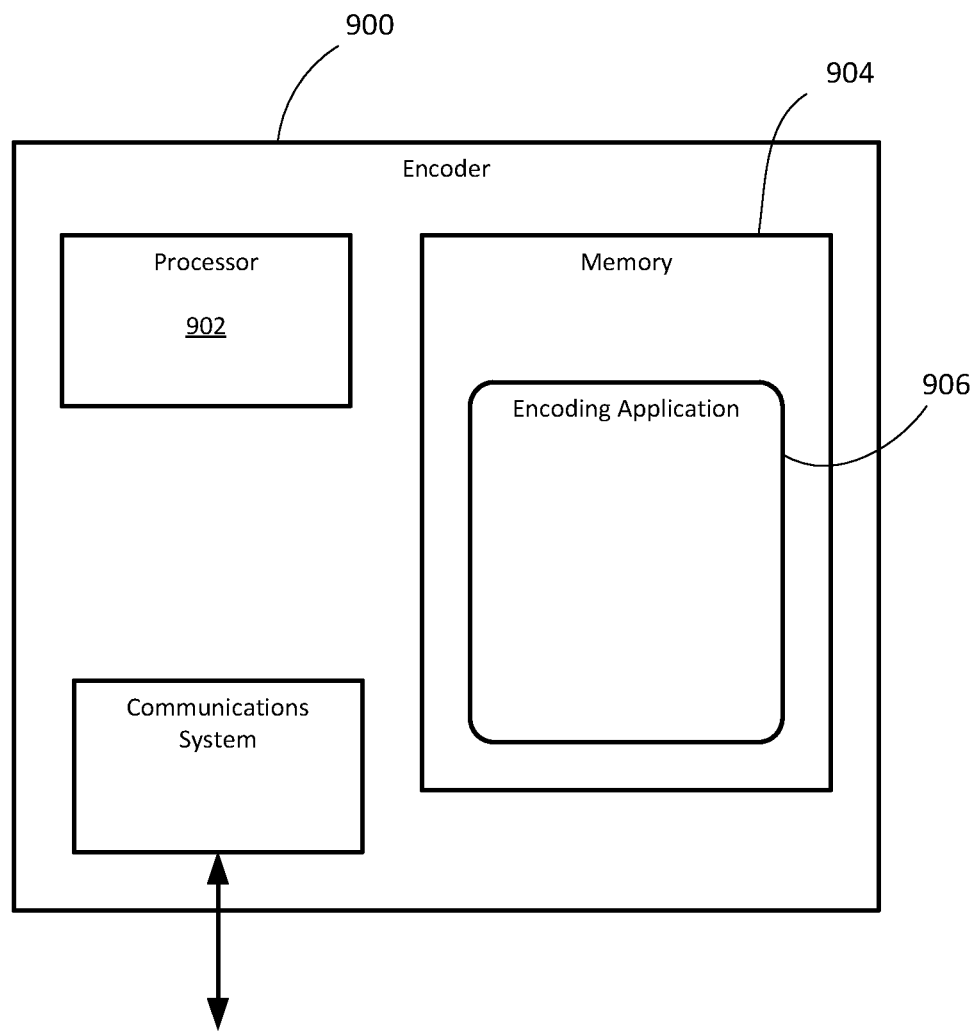
FIG. 10 shows a simplified block diagram of an example embodiment of an encoder.

Reference is now made to FIG. 10, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein.

It will be understood that the encoding application 906 may be stored in on a computer readable medium, such as a compact disc, flash memory device, random access memory, hard drive, etc.

Figure 11:
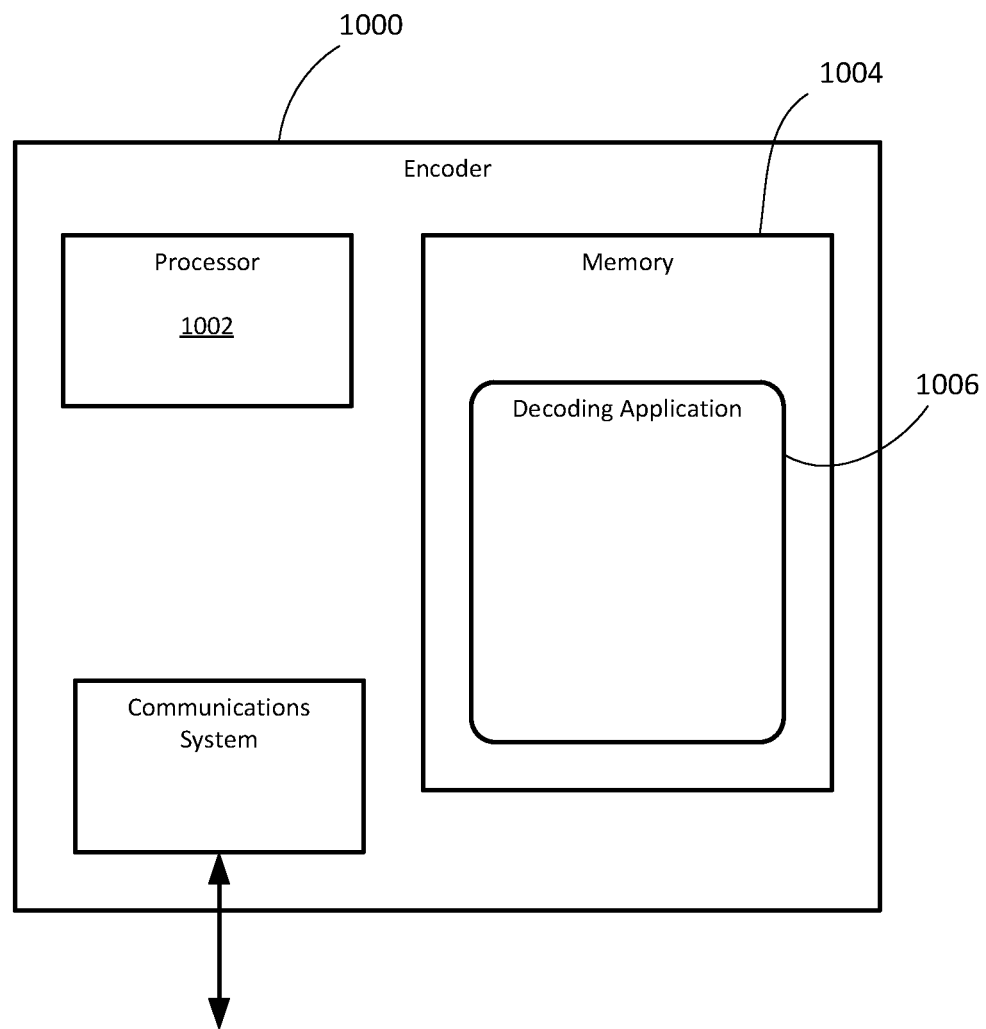
FIG. 11 shows a simplified block diagram of an example embodiment of a decoder.

Reference is now also made to FIG. 11, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of encoding video in a video encoder to output a bitstream of encoded data for a coefficient group containing a plurality of transform domain coefficients, the method comprising:
   encoding a significant-coefficient flag for each of the transform domain coefficients in a scan order within the coefficient group, each significant-coefficient flag having a corresponding greater-than-one flag;
   partitioning the greater-than-one flags into a plurality of non-overlapping n-tuples of greater-than-one flags, each n-tuple corresponding to n consecutive significant-coefficient flags in the scan order, wherein n is greater than one; and
   for each n-tuple, determining a tuple value based on the greater-than-one flags in the n-tuple and on the significant-coefficient flags corresponding to the greater-than-one flags in the n-tuple, and
      if the significant-coefficient flags corresponding to the greater-than-one flags in the n-tuple are all zero, foregoing encoding the tuple value, and
      otherwise, encoding the tuple value in the bitstream.

2. The method claimed in claim 1, wherein the coefficient group includes sixteen coefficients, wherein the coefficient group has sixteen significant-coefficient flags, and wherein the coefficient group has 8 n-tuples.

3. The method claimed in claim 1, wherein the tuple value is a logic function of the greater-than-one flags in the n-tuple and the significant-coefficient flags corresponding to the greater-than-one flags in the n-tuple.

4. The method claimed in claim 1, wherein the tuple value is a logic function of the greater-than-one flags in the n-tuple.

5. The method claimed in claim 4, wherein n is two and the logic function is a logical OR or a logical AND.

6. The method claimed in claim 1, wherein n is two and wherein at least one of the n-tuples has significant-coefficient flags corresponding to the greater-than-one flags in said at least one of the n-tuples that include a non-zero flag and a zero flag, and wherein the tuple value for said at least one of the n-tuples is the value of the greater-than-one flag corresponding to the non-zero flag.

7. The method claimed in claim 6, wherein another of the n-tuples includes greater-than-one flags corresponding to two non-zero significant-coefficient flags, and wherein the tuple value for said another of the n-tuples is a logic function of the greater-than-one flags of said another of the n-tuples.

8. The method claimed in claim 7, wherein encoding the tuple value of the another of the n-tuples further includes
   encoding a first of the greater-than-one flags for said another of the n-tuples using equiprobable coding;
   determining whether the value of a second of the greater-than-one flags for said another of the n-tuples may be inferred from the first of the greater-than-one flags and, if so, foregoing encoding the second of the greater-than-one flags and,
   otherwise, encoding the second of the greater-than-one flags using equiprobable coding.

9. The method claimed in claim 1, wherein n is greater than two.

10. A method of decoding a bitstream of encoded video in a video decoder to reconstruct a plurality of transform domain coefficients for a coefficient group, the method comprising:
    decoding a significant-coefficient flag for each of the transform domain coefficients in a scan order within the coefficient group, each significant-coefficient flag having a corresponding greater-than-one flag;
    based on a partitioning of the greater-than-one flags into a plurality of non-overlapping n-tuples of greater-than-one flags, each n-tuple corresponding to n consecutive significant-coefficient flags in the scan order, reconstructing a tuple value for each n-tuple, based on the greater-than-one flags in the n-tuple and on the significant-coefficient flags corresponding to the greater-than-one flags in the n-tuple, wherein,
       if the significant-coefficient flags corresponding to the greater-than-one flags in the n-tuple are all zero, the tuple value is inferred, without decoding, to be zero, and
       otherwise, decoding the tuple value from the bitstream, and wherein n is greater than one; and
    reconstructing the greater-than-one flags based on the reconstructed tuple values.

11. The method claimed in claim 10, wherein the coefficient group includes sixteen coefficients, wherein the coefficient group has sixteen significant-coefficient flags, and wherein the coefficient group has 8 n-tuples.

12. The method claimed in claim 10, wherein the tuple value is a logic function of the greater-than-one flags in the n-tuple and the significant-coefficient flags corresponding to the greater-than-one flags in the n-tuple.

13. The method claimed in claim 10, wherein the tuple value is a logic function of the greater-than-one flags in the n-tuple.

14. The method claimed in claim 13, wherein n is two and the logic function is a logical OR or a logical AND.

15. The method claimed in claim 10, wherein n is two and wherein at least one of the n-tuples has significant-coefficient flags corresponding to the greater-than-one flags in said at least one of the n-tuples that include a non-zero flag and a zero flag, and wherein the tuple value for said at least one of the n-tuples is the value of the greater-than-one flag corresponding to the non-zero flag.

16. The method claimed in claim 15, wherein another of the n-tuples includes greater-than-one flags corresponding to two non-zero significant-coefficient flags, and wherein the tuple value for said another of the n-tuples is a logic function of the greater-than-one flags of said another of the n-tuples.

17. The method claimed in claim 16, wherein decoding the tuple value of said another of the n-tuples further includes
    decoding a first of the greater-than-one flags for said another of the n-tuples using equiprobable coding;
    determining whether the value of a second of the greater-than-one flags for said another of the n-tuples may be inferred from the first of the greater-than-one flags and,
        if so, foregoing decoding the second of the greater-than-one flags and,
        otherwise, decoding the second of the greater-than-one flags using equiprobable coding.

18. The method claimed in claim 10, wherein n is greater than two.

19. An encoder for encoding video in a video encoder to output a bitstream of encoded data for a coefficient group containing a plurality of transform domain coefficients, the encoder comprising:
    a processor;
    a memory; and
    an encoding application stored in memory and containing instructions that, when executed by the processor, are to cause the processor to
        encode a significant-coefficient flag for each of the transform domain coefficients in a scan order within the coefficient group, each significant-coefficient flag having a corresponding greater-than-one flag,
        partition the greater-than-one flags into a plurality of non-overlapping n-tuples of greater-than-one flags, each n-tuple corresponding to n consecutive significant-coefficient flags in the scan order, wherein n is greater than one, and
        for each n-tuple, determine a tuple value based on the greater-than-one flags in the n-tuple and on the significant-coefficient flags corresponding to the greater-than-one flags in the n-tuple, and
            if the significant-coefficient flags corresponding to the greater-than-one flags in the n-tuple are all zero, forego encoding the tuple value, and
            otherwise, encode the tuple value in the bitstream.

20. A decoder for decoding a bitstream of encoded video in a video decoder to reconstruct a plurality of transform domain coefficients for a coefficient group, the decoder comprising:
    a processor;
    a memory; and
    a decoding application stored in memory and containing instructions that, when executed by the processor, are to cause the processor to
        decode a significant-coefficient flag for each of the transform domain coefficients in a scan order within the coefficient group, each significant-coefficient flag having a corresponding greater-than-one flag,
        based on a partitioning of the greater-than-one flags into a plurality of non-overlapping n-tuples of greater-than-one flags, each n-tuple corresponding to n consecutive significant-coefficient flags in the scan order, reconstruct a tuple value for each n-tuple, based on the greater-than-one flags in the n-tuple and on the significant-coefficient flags corresponding to the greater-than-one flags in the n-tuple, wherein,
            if the significant-coefficient flags corresponding to the greater-than-one flags in the n-tuple are all zero, the tuple value is inferred, without decoding, to be zero, and
            otherwise, decoding the tuple value from the bitstream,
        and wherein n is greater than one, and
        reconstructing the greater-than-one flags based on the reconstructed tuple values.

21. A non-transitory processor-readable medium storing processor-executable instructions for encoding video in a video encoder to output a bitstream of encoded data for a coefficient group containing a plurality of transform domain coefficients, wherein the instructions, when executed, are to cause one or more processors to:
    encode a significant-coefficient flag for each of the transform domain coefficients in a scan order within the coefficient group, each significant-coefficient flag having a corresponding greater-than-one flag;
    partition the greater-than-one flags into a plurality of non-overlapping n-tuples of greater-than-one flags, each n-tuple corresponding to n consecutive significant-coefficient flags in the scan order, wherein n is greater than one; and
    for each n-tuple, determine a tuple value based on the greater-than-one flags in the n-tuple and on the significant-coefficient flags corresponding to the greater-than-one flags in the n-tuple, and
        if the significant-coefficient flags corresponding to the greater-than-one flags in the n-tuple are all zero, forego encoding the tuple value, and
        otherwise, encode the tuple value in the bitstream.

22. A non-transitory processor-readable medium storing processor-executable instructions for decoding a bitstream of encoded video in a video decoder to reconstruct a plurality of transform domain coefficients for a coefficient group, wherein the instructions, when executed, are to cause one or more processors to:
    decode a significant-coefficient flag for each of the transform domain coefficients in a scan order within the coefficient group, each significant-coefficient flag having a corresponding greater-than-one flag,
    based on a partitioning of the greater-than-one flags into a plurality of non-overlapping n-tuples of greater-than-one flags, each n-tuple corresponding to n consecutive significant-coefficient flags in the scan order, reconstruct a tuple value for each n-tuple, based on the greater-than-one flags in the n-tuple and on the significant-coefficient flags corresponding to the greater-than-one flags in the n-tuple, wherein, if the significant-coefficient flags corresponding to the greater-than-one flags in the n-tuple are all zero, the tuple value is inferred, without decoding, to be zero, and otherwise, decoding the tuple value from the bitstream, and wherein n is greater than one, and reconstructing the greater-than-one flags based on the reconstructed tuple values.

23. The method of claim 1, wherein each significant-coefficient flag has a corresponding greater-than-one flag irrespective of whether that significant-coefficient flag is non-zero.

* * * * *